United States Patent
Furukawa et al.

(10) Patent No.: US 7,597,810 B2
(45) Date of Patent: Oct. 6, 2009

(54) PROCESS FOR PRODUCTION OF SUSPENSIONS, SOLUTIONS, OR DISPERSIONS

(75) Inventors: Ryuji Furukawa, Takasago (JP);
Masakuni Ueno, Takasago (JP);
Yoshihiro Ikeda, Takasago (JP)

(73) Assignee: Kaneka Corporation, Osaka (JP)

( * ) Notice: Subject to any disclaimer, the term of this patent is extended or adjusted under 35 U.S.C. 154(b) by 0 days.

(21) Appl. No.: 11/662,758

(22) PCT Filed: Sep. 14, 2005

(86) PCT No.: PCT/JP2005/016976

§ 371 (c)(1),
(2), (4) Date: Mar. 14, 2007

(87) PCT Pub. No.: WO2006/030841

PCT Pub. Date: Mar. 23, 2006

(65) Prior Publication Data

US 2007/0215555 A1    Sep. 20, 2007

(30) Foreign Application Priority Data

Sep. 15, 2004    (JP) ............................. 2004-268360

(51) Int. Cl.
*B01D 21/00* (2006.01)
*B01D 37/00* (2006.01)

(52) U.S. Cl. ..................... 210/710; 23/313 R; 210/702; 210/705; 210/767; 210/768; 210/800; 264/5; 528/936

(58) Field of Classification Search .................. 210/702
See application file for complete search history.

(56) References Cited

U.S. PATENT DOCUMENTS

| 4,064,093 | A | 12/1977 | Dalton et al. |
| 4,890,929 | A * | 1/1990 | Okada et al. ............. 366/181.1 |
| 5,466,266 | A | 11/1995 | Griffiths |
| 6,511,595 | B2 * | 1/2003 | Crompton et al. ........... 210/162 |
| 2004/0116741 | A1 | 6/2004 | Nordhoff et al. |
| 2007/0215555 | A1 * | 9/2007 | Furukawa et al. ........... 210/728 |

FOREIGN PATENT DOCUMENTS

| JP | 60-195102 A | 10/1985 |
| JP | 6-226079 A | 8/1994 |
| JP | 7-155520 A | 6/1995 |
| JP | 7-278238 A | 10/1995 |
| JP | 8-266929 A | 10/1996 |
| JP | 2000-219706 A | 8/2000 |
| WO | WO 02/055469 A1 | 7/2002 |

* cited by examiner

*Primary Examiner*—Peter A Hruskoci
(74) *Attorney, Agent, or Firm*—Sughrue Mion, PLLC

(57) ABSTRACT

The present invention provides a method for efficiently filtering slurry suspensions in a vessel including a nozzle flange near the vessel, when solids in the slurry suspensions being treated in the vessel are filtered for cleaning or for other purposes and subsequently subjected to reslurrying, dissolving or dispersing operation. A method for producing suspensions, solutions or dispersions comprising separating solids from slurry suspensions and then slurrying, dissolving or dispersing the solids again by adding a solvent, characterized in that the above described solids are separated in the same vessel as the one in which the operation to obtain the above described slurry suspensions has been performed and/or inside a flange directly connected to the same vessel.

2 Claims, 1 Drawing Sheet

PROCESS FOR PRODUCTION OF SUSPENSIONS, SOLUTIONS, OR DISPERSIONS

TECHNICAL FIELD

The present invention relates to a method for producing suspensions, solutions or dispersions, wherein, when solids are separated from slurry suspensions and slurried, dissolved or dispersed again by adding a solvent, the solids are separated in a vessel or in a nozzle flange near the vessel without transporting the slurry suspensions out of the vessel.

BACKGROUND ART

Generally, solids in slurry suspensions are filtered, and the solids are subsequently slurried again (hereinafter also referred to as reslurried), dissolved or dispersed again in a solvent for cleaning or dissolving or for other purposes. In such a case, the slurry suspensions are generally discharged outside a vessel temporarily in widely adopted methods, which include a method comprising the steps of subjecting the slurry suspensions to solid-liquid separation using a continuous or batch-type filtering device installed outside the vessel, transferring the separated solids to another vessel, and introducing a solvent to the solids to reslurry, dissolve or disperse the same; or a method comprising the step of performing filtration and reslurrying (optionally further performing dissolution or dispersion) using a batch-type filtering device installed outside the vessel. For example, Japanese Patent Laid-Open No. 2000-219706 also discloses a method comprising the steps of temporarily discharging a slurried polymer obtained by the treatment after polymerization, separating the polymer by filtration, then washing it with water in a separate container, obtaining a polymer by filtration, transferring the polymer to another container, and finally redispersing the polymer in water. Moreover, a horizontal filter press as shown below, in which filtration, reslurrying, cleaning, and dissolution or dispersion are performed, is widely adopted:

"SN-type automatic cake-scraping filter press" made by Japan Chemical Engineering & Machinery Co., Ltd.
"Multifunctional filter press" made by NGK Insulators, Ltd.

These filtering devices are generally equipped with filter cloths, filter net or filter plates each having openings, and in the case of a continuous filtering device, since it continuously uses such a filter medium, it has an advantage of reducing the size of the device itself. However, there are various problems in continuous filtering devices. For example, many driving parts are required, thereby increasing the parts requiring frequent maintenance; device cost essentially tends to be high; and since the device itself is of an open-type, use of any solvent may adversely affect environment.

On the other hand, in the case of a batch-type filtering device, since the amount that can be treated in one operation is limited, when the amount of treatment is intended to be increased, the size of the device itself tends to be increased. Moreover, numbers of filtering devices, both of continuous and batch types, are operated under reduced pressure or pressurized conditions for aspirating slurry suspensions or discharging filtrate. In addition, it is necessary to provide a powder transfer device for transferring solids after solid-liquid separation to a next vessel. Thus, there are problems of complicated steps and an increased burden of construction cost in a method comprising filtering slurry suspensions in a vessel using a filtering device outside the vessel, and then transferring the filtered slurry suspensions to another vessel for reslurrying, dissolving or dispersing solids.

DISCLOSURE OF INVENTION

Problems to be Solved by the Invention

An object of the present invention is to provide an efficient method for filtering slurry suspensions in a vessel or in a nozzle flange near the vessel, wherein the slurry suspensions are not filtered using a filtering device outside the vessel, when solids in the slurry suspensions in the vessel are filtered followed by reslurrying, dissolving or dispersing the same.

Means for Solving Problem

As a result of extensive research to solve the above described problems, the present inventors have completed the present invention. Specifically, the present invention relates to a method for producing suspensions, solutions or dispersions comprising separating solids from slurry suspensions and then slurrying, dissolving or dispersing the solids again by adding a solvent, characterized in that the solids are separated in the same vessel as the one in which the operation to obtain the slurry suspensions has been performed and/or inside a flange directly connected to the same vessel.

A preferred embodiment relates to the above described production method, characterized in that the slurry suspensions are obtained by agglomerating and enlarging particles suspended or dispersed in a liquid as fine particles.

Another preferred embodiment relates to the production method according to any of the above described production methods, characterized in that the solids are separated by a perforated plate placed on the bottom of the vessel or in the flange directly connected to the bottom of the vessel.

Another preferred embodiment relates to the above described production method, characterized in that the surface of openings in the perforated plate facing the slurry suspensions is open in the direction other than the right angle to the direction where the self-weight of the solids is applied during and after the separation of the solids.

Another preferred embodiment relates to the production method according to any of the above described embodiments, characterized in that the surface of openings in the perforated plate facing the slurry suspensions is open in the same direction as the direction where the self-weight of the solids is applied during and after the separation of the solids.

Effect of the Invention

By using the production method according to the present invention, operation to separate solids in slurry suspensions in a vessel and subsequently to reslurry, dissolve or disperse the solids can be performed simply and efficiently in the same vessel and at a low construction cost without using a continuous or batch-type filtering device outside the invention.

BEST MODE FOR CARRYING OUT THE INVENTION

The present invention relates to a method for producing suspensions, solutions or dispersions comprising separating solids from slurry suspensions and then slurrying, dissolving or dispersing the solids again by adding a solvent, more specifically to a production method in which the solids are separated in the same vessel as the one in which the operation to obtain the slurry suspensions has been performed and/or inside a flange directly connected to the same vessel.

The slurry suspensions that can be used in the present invention may include, for example, suspensions of polymer particles, crystallized particles, metal particles and the like. Among others, preferred suspensions are slurry suspensions obtained by agglomerating and enlarging particles suspended or dispersed in a liquid, since they have solids which are not hard and the solids are not adherent to each other. If the solids are hard, even very small amount of particles of the solids which have passed through a filter may stay in a valve, resulting in damage of the valve during opening and closing operation thereof. If the solids are adherent to each other, particles of the solids may form granules, which may plug the surface of a filter. An example of the preferred suspensions includes slurry suspensions containing polymer particles prepared by obtaining a polymer latex using water as a solvent, various monomers, an emulsifier and a catalyst, and then agglomerating and enlarging the polymer particles with a coagulant such as calcium chloride or hydrochloric acid. Another example of the preferred suspensions includes slurry suspensions containing a polymer with a low impurity content prepared by adding a solvent with high polarity, such as methanol, to a latex of polymer particles.

Further, in the present invention, the term "separating solids from slurry suspensions" may include the case where the solids containing a part of liquid phase are separated, in addition to the case where only solids are separated. In particular, considering that after solids are separated, the solids are slurried, dissolved or dispersed again by adding a solvent, the solids to be separated from slurry suspensions preferably contain a part of liquid phase, and specifically, the solids contain a liquid phase in an amount of 85 to 40% by weight, more preferably in an amount of 70 to 50% by weight.

In the present invention, the solids are preferably separated from slurry suspensions using a perforated plate placed on the bottom of a vessel in which the slurry suspensions are prepared or in a nozzle flange directly connected to the bottom of the vessel.

Preferably, a perforated plate which can be used in the present invention is a plate comprising a base plate made from metal, ceramics, fluorocarbon resins or the like and a plurality of holes formed therein by processing. Most desirably, the plate is a metal plate which can be easily processed and has high strength.

Figure 1:
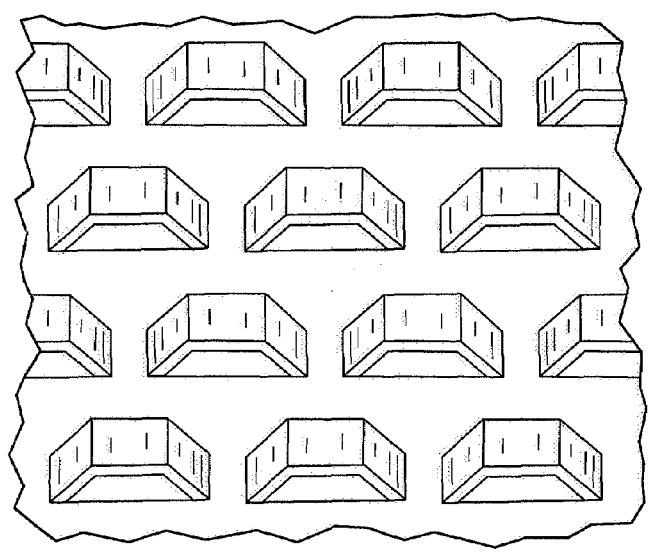
FIG. 1 is a perforated plate with openings in the shape of a bridge formed in a base filter plate.
Figure 2:
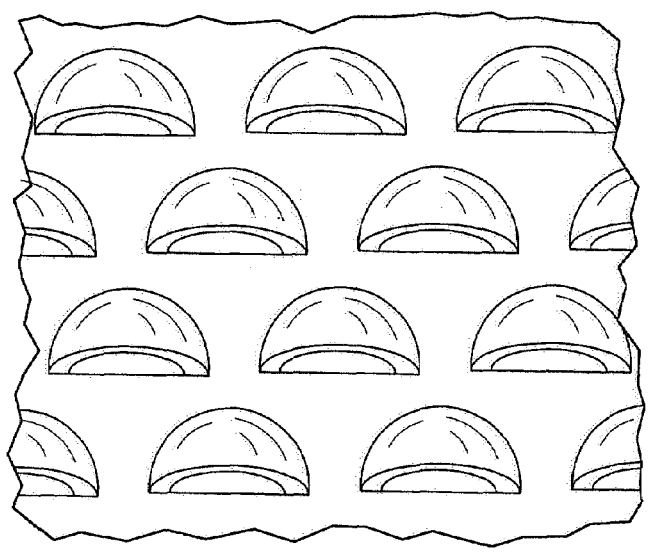
FIG. 2 is a perforated plate with openings in the shape of a semicircular bay window formed in a base filter plate.
Figure 3:
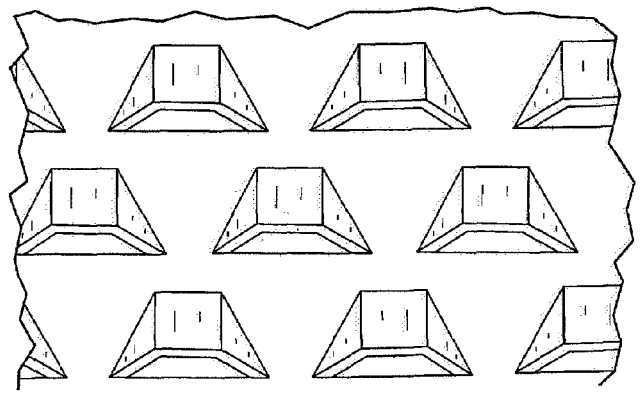
FIG. 3 is a perforated plate with openings in the shape of a triangle bay window formed in a filter base plate.

In general, any shape, such as a round shape, a square shape, and a slit shape that is an elongated square shape, can be used as the shape of the holes formed in the perforated plate by processing. A preferred perforated plate is the one in which the surface of openings in the perforated plate facing the slurry suspensions is open in the direction other than the right angle to the direction where the self-weight of the solids is applied during and after the separation of the solids that is, the perforated plate has a structure projecting from its base plate. A more preferred perforated plate is the one in which the surface of openings in the perforated plate facing the slurry suspensions is open in the same direction as the direction where the self-weight of the solids is applied during and after the separation of the solids (Refer to FIGS. 1 to 3). That is, in the case of a typical perforated plate in which the base filter plate has only holes therein without projections, when the content of solids in the slurry suspensions to be treated is increased, the solids may be pushed out of the openings of the perforated plate by the self-weight of the solids during separating operation; or the openings may be completely plugged with the solids, resulting in prevention of filtrate from being discharged therethrough. On the other hand, when a perforated plate having a structure projecting from the base filter plate is used, openings can be provided in the direction other than the right angle to, preferably in the same direction as, the direction where the self-weight of the solids is applied. This can prevent the solids from being pushed out of the openings of the perforated plate and allows the filtrate to flow out smoothly.

With regard to the size of the holes in the perforated plate, the opening area per hole of the surface of opening facing the slurry suspensions is preferably from 0.002 to 3 $cm^2$, more preferably from 0.01 to 1.2 $cm^2$. When the opening area per hole is less than 0.002 $cm^2$, separation speed tends to be remarkably reduced; on the other hand, when it is larger than 3 $cm^2$, the loss of the solids tends to sharply increase.

Solids in slurry suspensions have a number average particle size of preferably 0.05 mm or mare, more preferably 0.2 mm or more. When the solids have a number average particle size of less than 0.05 mm, the clearance between particles is reduced due to too small particle size, resulting in prevention of filtrate to be discharged from passing through. Thus, separation by filtration tends to take a long time. On the Other hand, the upper limit of the particle size of the solids is preferably 10 mm. When particles have a particle size of larger than 10 mm, the distance between particles during filtration is excessively large. Therefore, suspensions containing a large amount of fine particles may often pass between the large particles and through the openings of a perforated plate, flowing out as a part of filtrate. Specifically, the average particle size can be measured, for example, using a Coulter counter using a conventionally used electric resistance method (such as Multisizer made by Beckmann-Coulter Inc.).

The perforated plate to be used in the present invention is preferably placed on a discharge port at the bottom of the vessel, or in a nozzle flange connected to the discharge port at the bottom of the vessel. When the perforated plate is placed on a discharge part at the bottom of the vessel in which the slurry suspensions are prepared, the perforated plate can be welded thereto such that it covers the discharge port. On the other hand, when the perforated plate is placed in a nozzle flange connected to the discharge port at the bottom of the vessel, the edge part of the perforated plate which has no hole can be prepared and sandwiched between the gap in the flange. In this case, the flange part is preferably located closer to the discharge port at the bottom of the vessel. When the flange is located apart from the discharge port at the bottom of the vessel, the perforated plate is preferably placed closer to the bottom of the vessel by inserting it from the flange. This is because when the distance of piping between the discharge port at the bottom of the vessel and the perforated plate is increased, there is high possibility that the piping part may form a dead space during subsequent operation such as reslurrying and solids may be left behind in the piping.

The slurry suspensions immediately after they are subjected to agglomeration have a generally uniform slurry concentration while they are agitated. Therefore, before the slurry suspensions are subjected to separation by filtration, the agitation is stopped and they are left standing for a certain period of time until solid particles float or settle. Then, the filtration can be performed. The discharge speed of the filtrate during filtration is not particularly limited. However, when the floating particles start to settle immediately after starting filtration or during filtration, solids are likely to be discharged through the perforated plate together with the filtrate. Therefore, the discharge speed of the filtrate is preferably reduced to a few tenths of the normal speed at this time. When solids are likely to be discharged through the perforated plate together with the filtrate, the discharged filtrate can be returned to the vessel during filtration. It is possible to prevent the outflow of solids in the slurry suspensions by performing filtration combining a series of operation as described above with an interface detection sensor and a control sequence.

The solids which are filtered from the slurry suspensions in the manner as described above still stay in the vessel, and they can be subjected to subsequent operation such as reslurrying, dissolution or dispersion, which can be performed by a typical method comprising introducing a solvent medium such as water or solvents and agitating the mixture for a certain period of time. Examples of the solvent may include water, methanol and hexane for the purpose of cleaning, and acetone and methyl ethyl ketone for the purpose of dissolution and dispersion.

According to the method of the present invention, solids can be separated from slurry suspensions in a vessel without transferring them out of the vessel, or without using a filtering device outside the vessel, and can be subjected to the subsequent step, wherein the solids are reslurried, dissolved or dispersed in the same vessel. This method can make the manufacturing steps simple and lower the construction cost, and can remarkably reduce emissions of solvent into environment, when solvents are used in a system.

The production method of the present invention can be applied, for example, to production methods or applications as described below:

(1) In the case of obtaining a synthetic resin powder product from an aqueous latex, the production method of the present invention is applied to the operation in which cleaning and filtration are repeated by introducing water to a wet resin at an intermediate step using the same vessel as the one used for coagulation; and the resulting resin slurry is finally filtered using a filtering device, and the filtered resin is then dried through a drying step to provide a powder product.

(2) A large amount of water is added to a mixed solution prepared by mixing an aqueous polymer latex and a solvent to obtain a polymer aggregate, and solids are separated by applying the production method of the present invention. Then, a solution in which polymer particles are dispersed is obtained by introducing a solvent to the solids. Further, the solution is mixed with a polymer solution having different components obtained by solution polymerization, obtaining a dispersion in which polymers having different components are blended.

EXAMPLES

The present invention will be specifically described below with reference to examples, but the present invention is not limited to these examples.

Example 1

To a 10 L agitation vessel (inner diameter 200 mm, an agitator with four flat paddle blades of 100 mm diameter arranged in two stages in the direction of a shaft), was charged a graft-copolymer latex prepared by emulsifying and graft-polymerizing resin component monomers consisting of acrylonitrile, styrene and methyl methacrylate in the presence of a butadiene-styrene copolymer latex. Then, calcium chloride was added to the mixture under stirring to obtain 2,500 g of a slurry suspension composed of a floating aggregate. The aggregate had 750 g of solids and a number average particle size of 0.22 mm.

After stopping agitation, the slurry suspension was left standing for five minutes as the time for separation. Subsequently, the slurry suspension was filtered through a perforated plate (made by Nunobiki Seisakusho Co., Ltd., product name: semicircular bay window screen, product model SD2, opening height 1.2 mm, refer to FIG. 2) installed by welding so as to cover the discharge port (piping diameter 25 A) at the bottom of the agitation vessel. The water phase of the slurry suspension was discharged by gravity. The filtration was performed without any plugging of the perforated plate, leaving 1,920 g of the aggregate containing a part of the water phase and discharging 580 g of the water phase. Although about 2.3 g of the aggregate as solids flowed out (the outflow rate is 0.31% by weight: aggregate solids flowed out/aggregate solids in slurry suspension ×100) together with the water phase, recover 99.69% by weight of the aggregate solids in the slurry suspension were recovered.

Then, 3,000 g of acetone was charged into the vessel followed by agitation for 40 minutes at 350 rpm, thereby dispersing the aggregate remaining in the vessel in acetone to obtain a solution in which graft polymer particles are dispersed in acetone.

Example 2

To a 1,000 L agitation vessel (inner diameter 1,000 mm, an agitator with four flat paddle blades of 500 mm diameter arranged in two stages in the direction of a shaft), was charged the same graft-copolymer latex as the one used in Example 1. Then, calcium chloride was added to the mixture under stirring to obtain 250 kg of a slurry suspension composed of a floating aggregate. The aggregate had 75 kg of solids and a number average particle size of 0.25 mm.

After stopping agitation, the slurry suspension was left standing for ten minutes as the time for separation. Subsequently, the slurry suspension was filtered through a perforated plate (made by Nunobiki Seisakusho Co., Ltd., product name: bridge screen, product model SC2, opening height 1.2 mm, opening length 10 mm, refer to FIG. 1) placed so as to be sandwiched between the gap in the flange with a piping diameter of 100 A (located 10 cm below the discharge port at the bottom) installed in the piping directly connected to the discharge port at the bottom of the agitation vessel. The water phase of the slurry suspension was discharged by gravity. The filtration was performed without any plugging of the perforated plate, leaving 185 kg of the aggregate including a part of the water phase and discharging 65 kg of the water phase. Although about 430 g of the aggregate as solids flowed out (the outflow rate is 0.57% by weight: aggregate solids flowed out/aggregate solids in slurry suspension ×100) together with the water phase, recover 99.43% by weight of the aggregate solids in the slurry suspension were recovered.

Then, 300 kg of acetone was charged into the vessel followed by agitation for 60 minutes at 120 rpm, thereby dispersing the aggregate remaining in the vessel in acetone to obtain a solution in which graft polymer particles are dispersed in acetone.

Comparative Example 1

The same procedure was repeated as Example 1 to obtain the 2500 g of the slurry suspension, having the same aggregate as Example 1.

The obtained slurry suspension, while it is stirred, was discharged as it is through the discharge port at the bottom (piping diameter 25 A) once into a 5 L stainless steel container with a handle. Next, the slurry suspension was transferred from the stainless steel container to a Nutsche-type filter (filtration with filter paper, a filter of a system where the filtration bottle is depressurized by an aspirator) with a suction filtration bottle, obtaining 1,820 g of the aggregate containing a part of the water phase. The water phase discharged was 680 g.

Subsequently, the aggregate including a part of the water phase remaining in the Nutsche-type filter was scraped out with a stainless steel spoon and transferred to the 10 L vessel. Then, 3,000 g of acetone was charged into the vessel followed by agitation for 40 minutes at 350 rpm, thereby dispersing the aggregate remaining in the vessel in acetone to obtain a solution in which graft polymer particles are dispersed in acetone.

Comparative Example 2

The same procedure was repeated as Example 2 to obtain the 250 kg of the slurry suspension, having the same aggregate as Example 2.

The obtained slurry suspension, while it is stirred, was transferred as it is through the discharge port at the bottom (piping diameter 100 A) to the next step, a filtering step, using a slurry pump. In the filtering step, the slurry suspension was continuously treated using a vacuum-type continuous filtering device (of a system where a filter cloth is applied on a rotating drum and the inside of the drum is depressurized to continuously sucking the slurry suspension to allow the solids to adhere to the drum followed by scraping the solids).

The aggregate containing a part of the water phase scraped by the vacuum-type continuous filtering device was transferred to a 1,000 L vessel different from the above described vessel (which is being used for the slurry suspension) by a belt conveyor. Then, 300 kg of acetone was charged into the vessel followed by agitation for 60 minutes at 120 rpm, thereby dispersing the aggregate remaining in the vessel in acetone to obtain a solution in which graft polymer particles are dispersed in acetone.

Thus, use of the production method of the present invention can provide the target suspensions, solutions or the like without using a filtering device and a device to transfer solids after filtration.

The invention claimed is:

1. A method for producing a suspension, a solution, or a dispersion, comprising:
    making a slurry suspension in a vessel from a latex and a liquid, by agglomerating and enlarging fine particles in the latex;
    floating or settling the agglomerated and enlarged particles maintained in the slurry by leaving the slurry suspension standing without agitation until the particles float or settle;
    separating the agglomerated and enlarged particles from the slurry suspension left standing by discharging a water phase of the slurry in a first direction from a plurality of openings of a perforated plate;
    wherein the perforated plate comprises the plurality of openings, a plurality of holes and a plurality of projections;
    with each projection being associated with an opening and a hole,
    wherein each projection extends across its associated hole, and the associated opening is formed between a side face of its associated projection and an adjacent side face of the hole associated with its associated projection;
    the perforated plate being disposed in such a manner that the plurality of projections extend in a second direction which is at least partially opposite the first direction, and
    slurrying, dissolving or dispersing the particles by adding a solvent to the separated agglomerated and enlarged particles in the vessel.

2. The production method according to claim 1, wherein each opening defines a plane that extends in the same direction as the direction where the self-weight of the agglomerated and enlarged particles is applied during and after the separation of the agglomerated and enlarged particles.

* * * * *